United States Patent

[11] 3,582,885

[72] Inventors Walter Dietrich Pforzheim; Christian Ortmann, Morbach, Neckar; Rudolf Schlupp, Kornwestheim, all of, Germany

[21] Appl. No. 741,559
[22] Filed July 1, 1968
[45] Patented June 1, 1971
[73] Assignee International Standard Elecric Corporation New York, N.Y.
[32] Priority July 7, 1967
[33] Germany
[31] 1,549,902

[54] AUTOMATIC CHARACTER RECOGNITION METHOD AND ARRANGEMENT
4 Claims, 3 Drawing Figs.

[52] U.S. Cl. .......... 340/146.3
[51] Int. Cl. .......... G06k 9/12
[50] Field of Search .......... 340/146.3

[56] References Cited

UNITED STATES PATENTS

| | | | |
|---|---|---|---|
| 3,173,126 | 3/1965 | Rabinow | 340/146.3 |
| 3,176,271 | 3/1965 | Mader | 340/146.3 |
| 3,417,372 | 12/1968 | Bieser | 340/146.3 |

*Primary Examiner*—Daryl W. Cook
*Assistant Examiner*—William W. Cochran
*Attorneys*—C. Cornell Remsen, Jr., Walter J. Baum, Percy P. Lantzy, Philip M. Bolton, Isidore Togut and Charles L. Johnson, Jr.

ABSTRACT: A character recognition arrangement is disclosed in which the character field is scanned in a rastered fashion, and in which the scanning signals corresponding to the "black" value of the individual raster fields, are stored in analogue storage devices, and in which per character there is provided one resistance network whose resistors, on one hand, are connected to said analogue storage devices and, on the other hand, via a common junction point, are connected to a maximum detection circuit.

INVENTORS
WALTER DIETRICH
CHRISTIAN ORTMANN
RUDOLF SCHLUPP
BY Charles L. Johnson Jr.
ATTORNEY INVENTORS
WALTER DIETRICH
CHRISTIAN ORTMANN
RUDOLF SCHLUPP
BY Charles T. Johnson Jr.
ATTORNEY INVENTORS
WALTER DIETRICH
CHRISTIAN ORTMANN
RUDOLF SCHLUPP
BY Charles L Johnson Jr
ATTORNEY

AUTOMATIC CHARACTER RECOGNITION METHOD AND ARRANGEMENT

Character readers are already known comprising a matrix of storage cells for effecting the planar or areal storage of the scanned character. Likewise, it is already known to connect to the storage matrix a resistance network which is characteristic for each character, with the aid of which the character can be recognized out of the stored information. To this end all resistors of such a network are assembled with their one end to form a junction point, whereas the other ends thereof each extend to one storage cell.

If the storage cells are designed as bistable stages such as flip-flops, then each time one resistor is connected to that particular output of the flip-flop which, in the event of the proper character, is marked "1" (which may be assumed to correspond to the "black" portion of the character). With respect to all other flip-flops which, in the case of this character, then have stored "0" (corresponding to "white"), the resistors will be connected to the other flip-flop output, which then, accordingly, is likewise at "1."

Such a resistance network will then in the case of the proper, unobjectionably printed and stored character, and at all resistor ends which are connected to a flip-flop, have a voltage of e.g. 5 volts corresponding to the binary value "1." which thus will also appear at the junction point. At all other resistance networks, the same character will cause a smaller output voltage. With the aid of suitable well-known types of selection circuits (maximum detection circuits) it is possible to find out the highest voltage corresponding to the stored character and, consequently, the recognized character.

In cases where many characters, e.g. the letters of the alphabet and the numerals 0....9 are supposed to be recognized, however, then the voltage values for the individual characters are lying so close to one another that in the case of minor deviations a reliable recognition of similar characters is no longer possible. For overcoming this difficulty, therefore, in one conventional character recognition method, each time similar characters, such as the letters C, O, G and Q are assembled in groups, and first of all with the aforementioned means, there is determined or detected the respective group; parallel in relation thereto, and with the aid of subnetworks which require less resistors, the scanned character of the ascertained group is detected. In an earlier not prior published method for effecting the automatic character recognition, there is taken a somewhat other course, in which again to each character to be recognized there is assigned a resistance network, and in which auxiliary networks are provided for the critical characters, with the aid of which there is enabled an additional discrimination with respect to similar characters. Both methods, however, have the disadvantage of being sensitive to the "-black" distribution, especially also because the scanning signals are stored in a digitalized fashion, i.e. in the form of a Yes-No-information.

This recognition method will be hereinafter referred to as the inverting method.

The digital value store which has been considered as a prerequisite in this case, has the well-known disadvantage with respect to an analogue value store, that by the black-and-white digitalization there is caused a considerable loss of information, which can only be compensated by a higher resolution or a multistage quantizing of the grey stages, hence in both cases only be requiring a considerably greater expenditure. Since, moreover, there are available extremely economically priced analogue value storage elements, such as the capacitor, an analogue value storage method is of particular advantage especially in the case of voluminous sets of characters or a poor printing quality.

Also in this case, of course, there may be used the above-described reliable and simple inverting method for recognizing the characters, in that a conventional type of linear inverter is connected to the analogue value amplifier, so as to have available at the output of both the amplifier and the inverter again the contradictory voltage values for the resistance networks, but the method will only operate unobjectionably under the important and restricting conditions that either the number of resistors wired to "white" is equal or approximately equal to the number of the resistors wired to "black", or that the contrast (or the blackening of the characters respectively) may not vary within the limits corresponding to the actual conditions, or that finally especially in the case of interferences or disturbances in the character pattern, the signal differences between similar characters, under certain circumstances, become smaller than necessary and owing to the actual information contents of the printed characters.

These restricting conditions shall be avoided by the present invention.

Object of the present invention is an arrangement for effecting the automatic character recognition in a recognition method in which the character field is scanned in a rastered fashion, and in which the scanning signals corresponding to the black-value of the individual raster fields, are stored in analogue storages, and in which there is provided one resistance network per character, with the resistors of said network being connected on one hand to the analogue storage devices and, on the other hand, via a common junction point, to a maximum detection circuit.

According to the invention the individual resistance networks are each time divided into two partial networks with each time one junction point of their own; the free ends of the first partial network are connected to points of the analogue storage devices which, with respect to the associated character, conduct a voltage corresponding to the black raster fields, whereas the free ends of the second partial network are connected to those points of the analogue storage devices which conduct a voltage corresponding to the white raster fields; moreover there is provided a differential amplifier for each partial network pair, in which there is constituted the difference between the two junction-point voltages, with this difference voltage thereafter being offered to the maximum detection circuit whose output signal serves to mark the scanned character.

Accordingly, the voltage appearing at the output of the individual differential amplifier is equal to the difference between the two junction-point voltages as applied to the inputs, i.e. in such a way that in the case of a positive difference there is available an output voltage, and that in the case of a negative difference, the output voltage is zero. The new recognition method, therefore, may be referred to as a differential method.

The contradictory seizing and utilization or evaluation of the black and white raster fields has already been proposed in connection with digital recognition methods, as may be taken from the prior published German Pat. No. 1,114,349. But also this method is subject to the above-mentioned disadvantages, which are peculiar to all digital evaluation methods.

In the following the invention will now be explained in detail and by way of example with reference to FIGS. 1 to 3 of the accompanying drawings, in which.

The invention will now be explained in detail with reference to the example of the characters L and B. In the inverting method as known per se the following equation is applicable to the voltage U as appearing at the junction point of each resistance network associated with a character, during the evaluation of the signals stored in the analogue value storages:

$$\frac{U}{U_0}=a.k+b \qquad (1)$$

wherein $u_0$ is the maximum voltage as stored in the analogue value storages, corresponding to a completely blackened surface element, and wherein $a$ indicates the shape of the character including the width of striae, spots and faulty points, $k$ the printing contrast of the character, and $b$ indicates the relationship between the white evaluated points and the total number of the evaluated points.

The difference between the voltages $U_L$ for the character $L$ and $U_B$ for the character $B$ according to equation (1)

Figure 1:
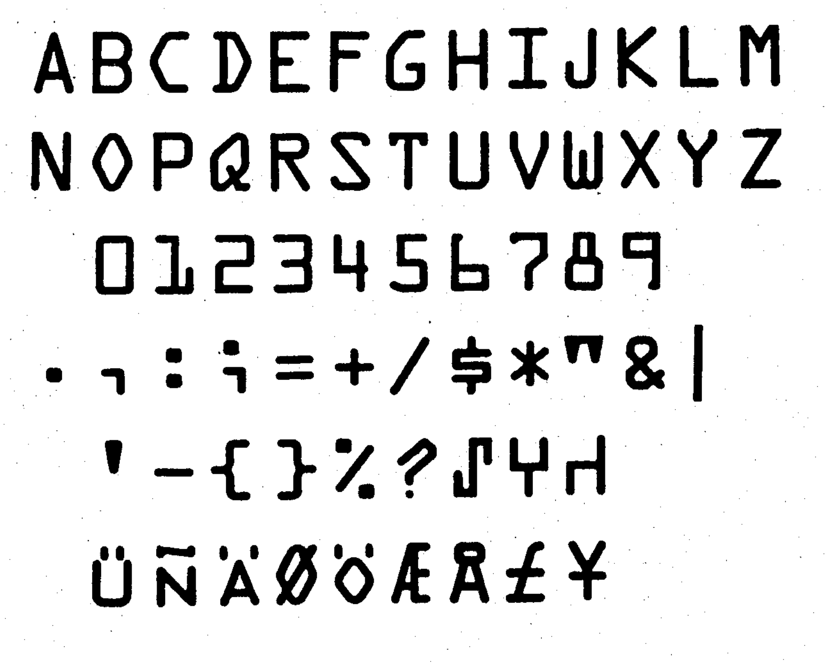
FIG. 1 shows the complete optical character recognition type of font A (OCR–A)

$\Delta U=U_BU_L>O$ (2)

is fed to a maximum detection circuit and must, when considering the total contrast area from 0.4 ... 1.0, be greater than zero in cases where $B$ is supposed to be unambiguously distinguished from $L$, in which case at the junction point of the resistance network associated with the character $B$ there must appear a higher voltage than at the junction point of a resistance network associated with the character $L$ or any other character. With respect to about 50 percent of the combinations of two characters according to FIG. 1 it is possible, with the aid of equation (1) and the condition $\Delta U=0$ according to equation (2)$=UO$, to ascertain a contrast $K_o$ resulting from the special configuration of the chosen pair of characters including the width of its striae and which, hereinafter, will be referred to as the critical contrast. The printed pattern of a character is at least required to have this contrast in order to be recognized as such. In cases where the printed pattern has a lower contrast, it will be recognized as a different character.

With respect to a number of characters, the critical contrast is lying beyond the minimum printing contrast of 0.4 which is still admissible. If then the printing contrast of one of these characters is lying below $K_o$ but beyond 0.4, this will regularly result in a faulty recognition.

As a numerical example there will now be considered the letters L and B, in the course of which the notation B/L is meant to imply that the character B is stored-in, and that the voltage appearing at the junction point of the resistance network corresponding to the character L is indicated with reference to $U_O$.

Figure 2:
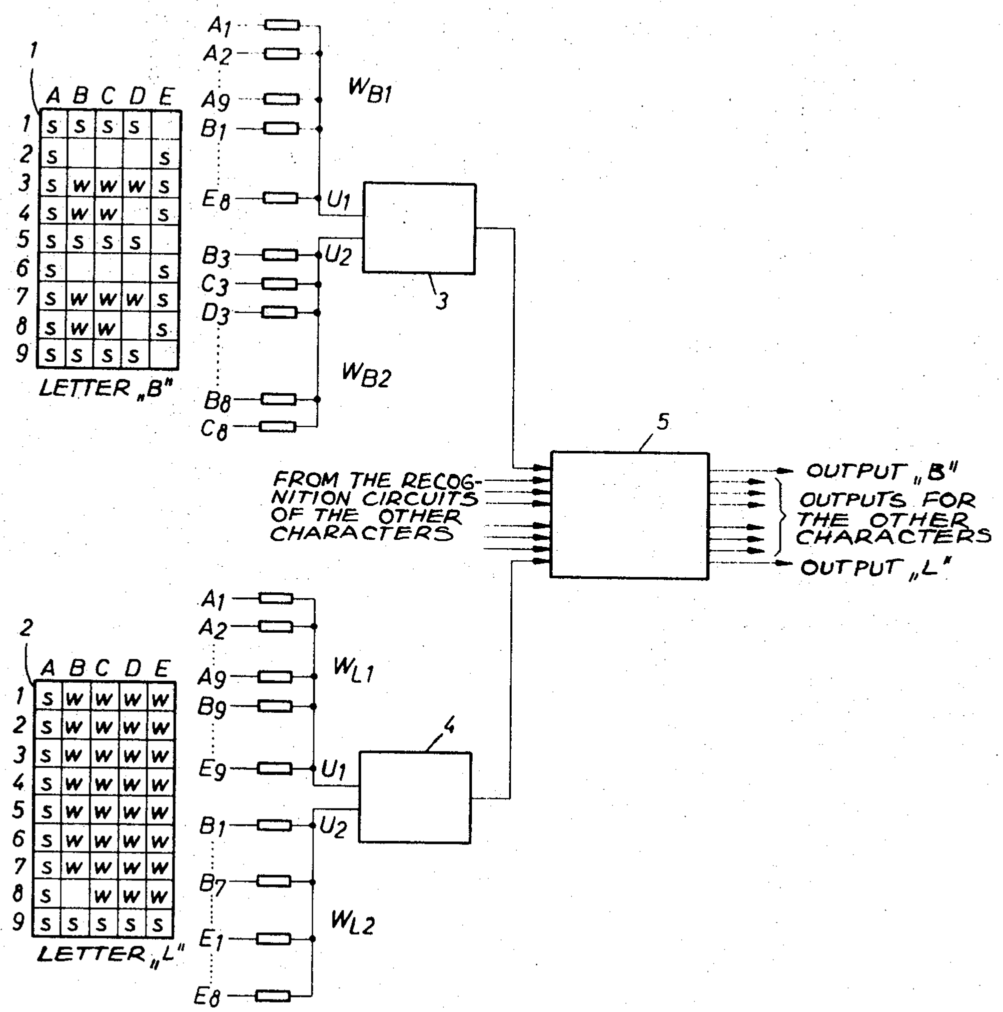
FIG. 2 shows a block diagram for explaining the differential method according to the invention showing the wiring of the recognition circuits for the letters B and L as an example.

In the case of a 100 per cent printing contrast and a wiring of the resistance networks according to the representation in FIG. 2 the following is applicable:

| Combination | $U/U_o$ |
|---|---|
| B/B | 1.00 |
| B/L | 0.70 |
| L/L | 1.00 |
| L/B | 0.65 |

In the case of a printing contrast of 0.5 the following is applicable:

| Combination | $U/U_o$ |
|---|---|
| B/B | 0.65 |
| B/L | 0.70 |
| L/L | 0.85 |
| L/B | 0.47 |

When reading the character $B$ with a contrast of 0.5 according to the inverting method, there will appear at the junction point of the resistance network corresponding to the character $B$, a voltage of 0.65 of the maximum possible voltage, and at the resistance network corresponding to the character L, however, a voltage of 0.70. The subsequently following maximum (value) detection circuit will provide a signal at the output corresponding to the character L, in other words: B is recognized as L.

The problem resulting from the existing impossibility of recognizing with the aid of the inverting method characters with a printing contrast between 0.4 —1.0 as specified according to the German Industrial Standards (DIN) 66 008, is solved according to the present invention by the separate evaluation or utilization of black and white surface elements of each character with the aid of two partial resistance networks each time associated with the black or the white surface elements of a character respectively, which serve to directly evaluate or utilize the surface areas associated therewith, and with the aid of a differential amplifier associated with each character, whose inputs with high input resistance values with respect to the total resistance of the partial network evaluating or utilizing the least of the surface elements, being connected to the junction points of the two partial networks of each character. In the inventive type of differential method there will result at the output of each differential amplifier associated with a character, and towards ground, a signal according to $$\frac{U}{U_0}=a'\cdot k \qquad (3)$$

with $U_O$ and $k$ as in equation (1). $a'$ is a factor characterizing the shape of the character including the width of striae, which differs from $a$ in equation (1). The equation (3) represents straight lines coming from the origin and, therefore, do not intersect each other at any of the contrasts $k>o$. Consequently, a basic faulty recognition of the kind as appearing in the inverting method, is excluded.

The example of the characters L and B shall be used to distinctly show the advantage over the conventional inverting methods, as achieved by the invention:

In the case of a 100 percent printing contrast the following is applicable:

| Combination | $U/U_o$ |
|---|---|
| B/B | 1.0 |
| B/L | 0.537 |
| L/L | 1.0 |
| L/B | 0.5 |

In the case of 50 percent printing contrast the following is applicable:

| Combination | $U/U_o$ |
|---|---|
| B/B | 0.5 |
| B/L | 0.267 |
| L/L | 0.5 |
| L/B | 0.25 |

The signal of the combination B/B, according to equation (3), has become smaller by 50 percent, but has still remained greater than the signal of the combination B/L, in other words : a faulty recognition has been avoided.

Moreover, the inventive advantage of the proposed differential method resides in the fact that the signal difference between the output of the differential amplifier associated with the character to be read, and the output of a differential amplifier associated with a similar character is greater than the signal difference obtainable with the inverting method as known per se. If, with respect to all characters, the same or equal number of black and white surface elements is being evaluated or utilized, then the signal at the input of the maximum detection circuit according to the differential method will amount to double the signal according to the inverting method.

FIG. 2 shows a block diagram for explaining the inventive differential method. On the left-hand side there are shown, above, the black-and-white markings for the letter "B" in the raster field 1 and, below, for the letter "L" in the raster field 2. In this showing "S" stands for black, and "W" stands for white. With respect to the individual letters there are each time only considered as many white fields as are necessary for enabling an unambiguous distinction from the other characters.

To each character there are now assigned two partial resistance networks $W_{B1}$ and $W_{B2}$ or $W_{L2}$ respectively. The raster fields $A_1$.... $A_9$....$E_9$ which are connected to the individual resistors, are indicated at the resistors. The junction-point voltages of the resistance network pairs serve to control the differential amplifiers 3 or 4 respectively; the output signals of all differential amplifiers are applied to the maximum detection circuit 5 in which there is effected the evaluation or utilization as explained on page 2, lines 7—11. For each character to be recognized, the maximum detection circuit comprises one output lead of which always only the lead associated with the scanned character is marked.

Figure 3:
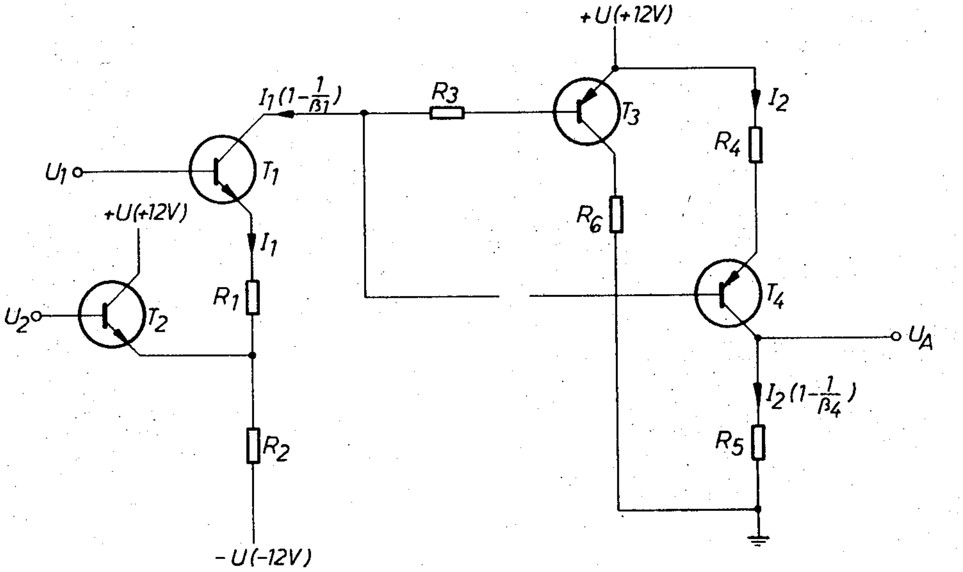
FIG. 3 shows a differential amplifier capable of being used for the purpose of the invention.

FIG. 3 shows a differential amplifier which may serve to solve the given problem. The junction-point voltages $U_1$ and $U_2$ are fed to the two transistors $T_1$ and $T_2$, whereas the output difference voltage $U_A$ is taken off at the transistor $T_4$. The remaining mode of operation of the circuit arrangement according to FIG. 3 will be easily understood without requiring any further explanation.

The reliable recognition of the characters requires a very good equality of the properties of all differential amplifiers. To this end the circuit for realizing the idea of invention according to FIG. 3 merely requires an exact adherence to the relationship $$\frac{R_5 \cdot R_3}{R_4 \cdot R_1}$$

In the proposed arrangement, for example, the temperature response and the deviation from the nominal values may be very considerable, but must have the same relative value with respect to all four elements of the quotient.

We claim

1. An arrangement for automatic character recognition in which the character is scanned in a raster fashion and in which the scanning signals corresponding to a black value of the individual raster field are stored in analogue storage devices, the arrangement comprising:

a resistance network per character, said network being divided into first and second partial networks each having a common junction point, the free ends of said first network are connected to the points of the analogue storage devices which conduct a voltage corresponding to the black raster fields, and the free ends of said second network are connected to the points of the analogue storage devices which conduct a voltage corresponding to the white raster fields;

differential amplifier means for each partial network pair coupled to the two common junction points to provide a difference voltage output between said points, the means including a first transistor connected to one of said junction points, first and second resistors series connected in the collector-emitter of said first transistor, a second transistor having an emitter-base path connected between said first and second resistor, and a pair of differentially coupled transistors having their base electrodes coupled in the collector-emitter path of said first transistor; and a maximum detection circuit coupled to receive the output of all the differential amplifier means to provide an indication of the scanned character.

2. The arrangement according to claim 1 wherein the resistance value of said first and second resistors is large in comparison with the parallel connection of the partial-network resistors of the character with the smallest number of resistors in the partial network.

3. The arrangement according to claim 2 including:

a third resistor coupled between bases of said differentially coupled transistors;

a fourth resistor coupled between the emitters of said differential coupled transistors;

a fifth and sixth resistor each coupled to a collector of said differentially coupled transistors and to a common potential point whereby the differential output is taken across one of said resistors and common potential point.

4. The arrangement according to claim 3 wherein all the resistors in each differential means have a constant relation defined by ratio of the fifth resistance times the third resistance divided by the fourth resistance times the first resistance.